(12) United States Patent
Bennie et al.

(10) Patent No.: US 8,068,019 B2
(45) Date of Patent: Nov. 29, 2011

(54) TRAILER IDENTIFICATION SYSTEM

(75) Inventors: Brian Bennie, Sterling Heights, MI (US); Thomas Lee Miller, Ann Arbor, MI (US); Thomas Michael McQuade, Ann Arbor, MI (US); Ibrahim Issa, Schererville, IN (US)

(73) Assignee: Ford Global Technologies, Dearborn, MI (US)

( * ) Notice: Subject to any disclaimer, the term of this patent is extended or adjusted under 35 U.S.C. 154(b) by 393 days.

(21) Appl. No.: 12/342,101

(22) Filed: Dec. 23, 2008

(65) Prior Publication Data

US 2010/0156667 A1 Jun. 24, 2010

(51) Int. Cl.
*B60C 23/00* (2006.01)
*B60Q 1/00* (2006.01)
*G06F 7/00* (2006.01)
*B60L 1/00* (2006.01)

(52) U.S. Cl. ............... 340/442; 340/425.5; 340/431; 340/438; 307/9.1; 701/29; 701/32

(58) Field of Classification Search ............... 340/442
See application file for complete search history.

(56) References Cited

U.S. PATENT DOCUMENTS

| | | | |
|---|---|---|---|
| 5,999,091 | A | 12/1999 | Wortham |
| 7,026,922 | B1 * | 4/2006 | Talukder et al. ............ 340/442 |
| 7,120,928 | B2 | 10/2006 | Sheth et al. |
| 7,260,497 | B2 | 8/2007 | Watabe |
| 7,280,898 | B2 | 10/2007 | Lesesky et al. |
| 7,839,270 | B2 * | 11/2010 | Shimura ............ 340/431 |
| 2003/0109971 | A1 * | 6/2003 | Knosmann et al. ........ 701/29 |
| 2004/0083040 | A1 | 4/2004 | Parrott et al. |
| 2006/0279416 | A1 | 12/2006 | Watabe |

FOREIGN PATENT DOCUMENTS

WO   WO 2007/055103 A1   5/2007

OTHER PUBLICATIONS

"Smartire Systems Inc"; <http://www.secinfo.com/dsVsb.713m.htm?FirefoxHTML\Shell\Open\Command> May 6, 1998.

* cited by examiner

*Primary Examiner* — Donnie Crosland
(74) *Attorney, Agent, or Firm* — Angela M. Brunetti; Fredrick Owens

(57) ABSTRACT

A system and method that, upon connection of a trailer to a tow vehicle, recognizes the trailer and applies a stored trailer configuration in a controller. In one embodiment, tire pressure sensors transmit RF signals that are received by the tire pressure monitoring system. Transmissions from the sensors are decoded in a controller and processed to identify, or create a particular trailer configuration as well as implement tire pressure monitoring automatically calibrated to the particular trailer configuration based on the sensor identifications for the tire pressure sensors. In another embodiment, the trailer configuration includes a pulse width modulated gain control for the trailer brakes.

23 Claims, 3 Drawing Sheets

TRAILER IDENTIFICATION SYSTEM

TECHNICAL FIELD

The present invention relates to a method to identify a trailer towed by a vehicle and more particularly to a method for identifying a trailer using a tire pressure monitoring system and applying or storing a trailer configuration for tracking a trailer usage profile.

BACKGROUND

Various types of pressure sensing systems for monitoring the pressure within the tires of an automotive vehicle or a trailer have been proposed. Such systems generate a pressure signal using an electromagnetic signal, which is transmitted to a receiver. The pressure signal corresponds to the pressure within the tire. When the pressure drops below a predetermined pressure, an indicator is used to signal the vehicle operator of the low pressure.

Sport utility vehicles and other large vehicles are often used to pull a trailer, and it is not uncommon for a vehicle owner to have more than one trailer. Even with one trailer, it is desirable to monitor the condition of the trailer tires as well as the primary vehicle tires for maintenance purposes. A drawback associated with known methods for identifying and tracking trailer information is that driver intervention is required in order to properly configure the system. The driver is required to calibrate an RF receiver with the associated sensors mounted in the tires of the trailer.

It is commonplace for a vehicle to tow several different trailers and there is a need for a method of identifying a trailer that has been attached to the vehicle without driver intervention. Upon identification of the trailer that has been attached to the vehicle, a stored trailer configuration may be selected from the trailer brake controller which will allow the trailer brake controller to track statistics related to the trailer and also apply a customized, or automated gain setting for the identified trailer.

SUMMARY

The present invention provides a system and method for automatically identifying a trailer that has been attached to a vehicle for towing comprising the combination of features of the independent claims, preferred optional features being introduced by the dependent claims.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention. In the figures, like reference numbers will be used to illustrate the same components. Those skilled in the art will recognize that the various components set forth herein may be altered without varying from the scope of the inventive subject matter. The inventive subject matter may be directed to a trailer and a tow vehicle equipped with integrated trailer brake control as described in U.S. Pat. No. 6,966,613, incorporated herein by reference, and a tire pressure monitoring system as described in U.S. Pat. No. 7,026,922, incorporated herein by reference. It should be noted that while the inventive subject matter is described herein with reference to an initiator based tire pressure monitoring system and an integrated trailer brake controller, the inventive subject matter may be practiced with a tire pressure monitoring system other than an initiator based system and/or without an integrated trailer brake controller without departing from the scope of the inventive subject matter.

Figure 1:
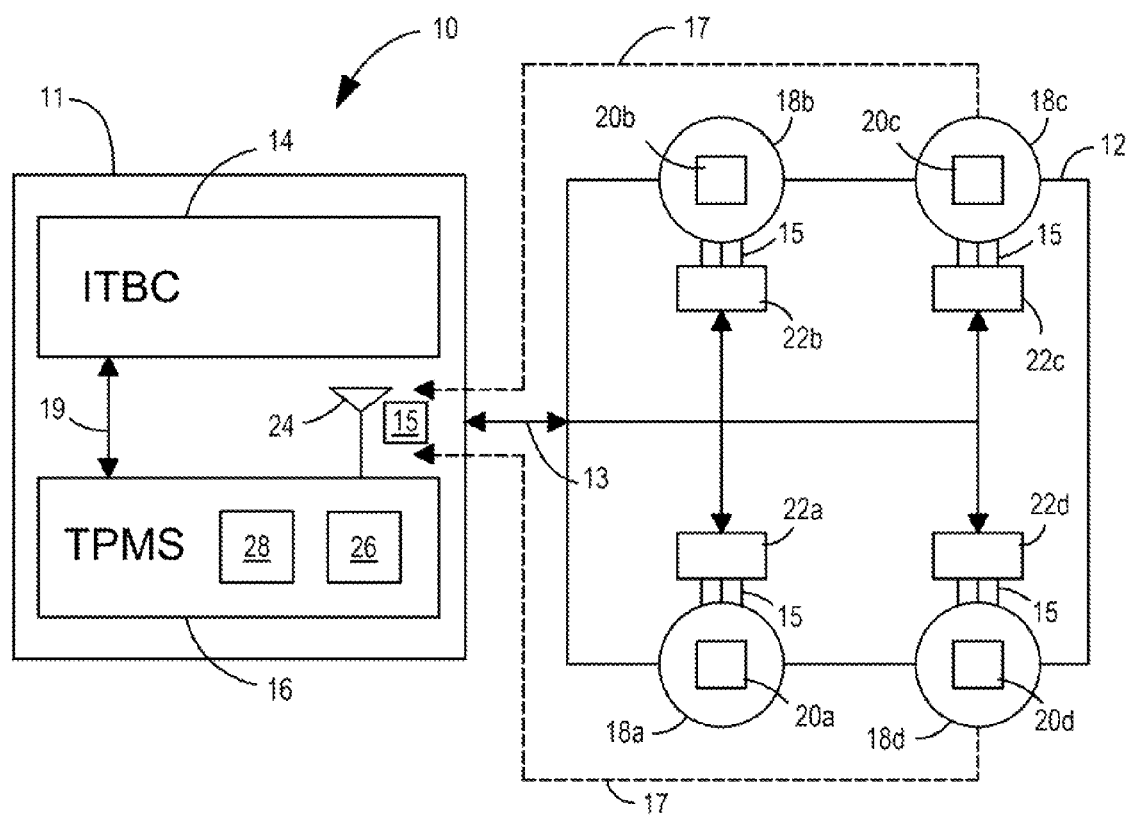
FIG. 1 is a block diagram of a system for pressure monitoring of the inventive subject matter.

FIG. 1 shows a tire pressure monitoring system 10 of the inventive subject matter for monitoring the air pressure in a trailer's tires. The inventive subject matter is directed to a trailer 12, which is preferably connected to an automotive vehicle 11, also referred to as a tow vehicle. The trailer 12 may be in communication with various vehicle systems, including, but not limited to, an integrated trailer brake controller 14 on the tow vehicle, a tire pressure monitoring system 16, also on the tow vehicle and possibly a rear camera system 15. Communication between the trailer and the integrated trailer brake controller may be through hard wired connections 13 as well as low frequency (LF) 15 and radio frequency (RF) transmissions, 17. In the present example, the trailer 12 has four tires 18. A left front tire, 18a, a right front tire, 18b, a right rear tire, 18c, and a left rear tire 18d are shown. It should be noted that while a four-tire arrangement is shown, it is possible that the trailer may have more, or fewer, tires. One skilled in the art is capable of applying the inventive subject matter described herein to a trailer having a different number of tires than the example detailed herein.

Each tire 18 is positioned upon a corresponding wheel on the trailer 12. Each tire has a respective tire pressure sensor circuit 20a, 20b, 20c, and 20d and an initiator 22a, 22b, 22c, and 22d that may be part of the trailer's electric brake system, and are situated within the trailer's wheel wells. Each initiator is positioned adjacent to the tire and initiates each sensor 20. The initiators 22 generate low frequency RF signals 15 recognized by and initiating a response from each sensor 20a-20d so that the position of each sensor 20a-20d may be recognized by the pressure monitoring system 10 on the vehicle. The initiators 22, which are part of the trailer's electric brakes, are coupled to the integrated trailer brake controller 14 on the tow vehicle. An antenna 24 on the pressure monitoring system 10 receives signals sent by the sensors 20a-20d once they are activated by the initiators 22a-22d.

The initiators 22 may be the electric brake magnets that are part of the trailer's electric brake system, or they may be separate components. The electric brake magnets may act as initiators when not being utilized for braking. The integrated brake controller 14, upon detection connectivity of the trailer 12 to the tow vehicle, will send a signal 13 to the initiators, which emit the low frequency signal 15 to excite the sensors 20 as needed, or requested, by the tire pressure monitoring system 16. The integrated trailer brake controller 14 automatically recognizes the connection of the trailer 12 to the towing vehicle.

It should be noted that, while the inventive subject matter is described herein with reference to an initiator based tire pressure monitoring system, a tire pressure monitoring system other than the initiator based system described above is capable of being applied to the inventive subject matter without departing from the scope of the inventive subject matter.

When the trailer is connected, the tow vehicle may or may not know that the connection has occurred. With an integrated trailer brake controller 14, the tow vehicle will be able to recognize when a trailer has been connected and will be able to query sensors before the trailer moves. Without an integrated trailer brake controller 14, each time the vehicle goes from park to moving, the tow vehicle listens for sensors on the trailer.

When the trailer is connected to a tow vehicle having an integrated trailer brake controller, the integrated trailer brake controller informs the tire pressure monitoring system to begin monitoring information at the TPMS and at the same time, activates the initiators. The sensors 20a-20d respond to the signal that is generated from the initiators 22a-22d. As a result, the sensors transmit RF signals 17 that are received by the antenna 24. The antenna 24 is coupled to a receiver 26 in the tire pressure monitoring system. A controller 28 is coupled to the receiver 26 which has an antenna 24 associated therewith. Receiver 26 receives pressure information and other information, including sensor identifications, from the tire pressure sensors 20a, 20b, 20c, and 20d to be processed by controller 28. Transmissions from the sensors 20a-20d are decoded in the controller 28 and processed as necessary for tire pressure monitoring automatically calibrated to the tire pressure monitoring system 10 and the system 10 can request the pressure data from the sensors 16 by way of the low frequency field generated by the electric brakes.

The controller 28 may contain a database of known sensor identifications that are related to a known trailer configuration, of which there may be more than one. It is common for a tow vehicle to be used for more than one trailer. By recognizing a trailer connected to the tow vehicle through recognition of the sensor identifications, it is possible to identify a known trailer configuration, resulting in several advantages being realized. For example, it is possible that various vehicle systems on the tow system may be calibrated so as to optimize the performance of the vehicle and the trailer being towed. Further, the controller 28 may track data relevant to the trailer being towed. For example, mileage, speed (average and maximum) of the trailer, and other data may be collected and used for scheduling maintenance on the vehicle as well as improving the overall performance of the tow vehicle and the trailer. This information may be referred to as a trailer usage profile.

Upon identification of the trailer, the controller compares the sensor identification from the trailer's TPMS to the database of known sensor identifications in order to determine if the transmitted sensor identification is associated with a known trailer configuration. The controller is able to discern, based on all of the sensor identifications transmitted, whether a trailer configuration for this particular trailer has been previously stored, whether the trailer has a configuration that has been previously stored but has had less than all of the sensors replaced, and whether a new trailer is being attached that may be assigned a newly stored trailer configuration.

Figure 2:
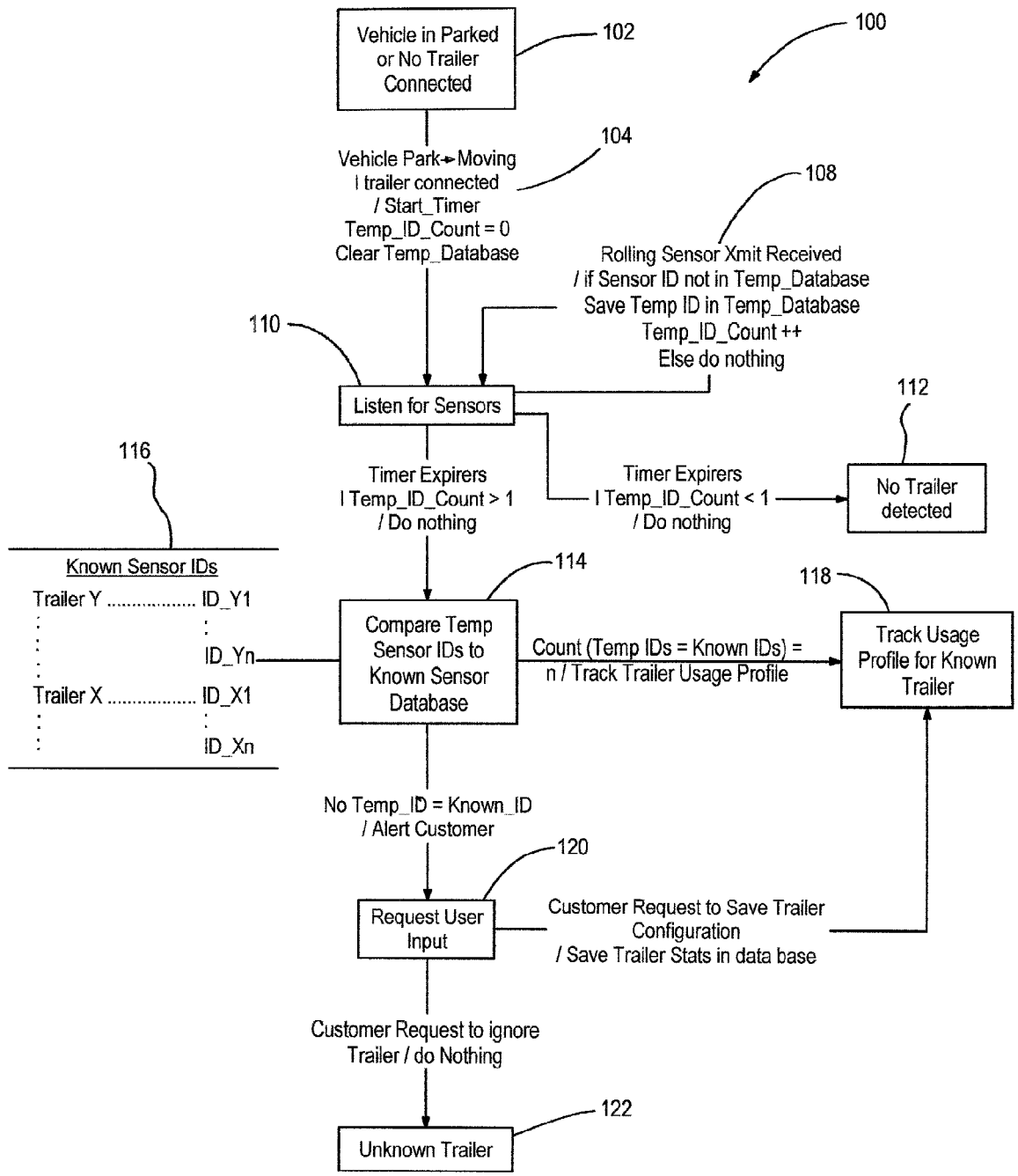
FIG. 2 is an example of a state diagram for the method of the inventive subject matter using tire pressure sensors on the trailer.

FIG. 2 is an example of a state diagram for the method of the inventive subject matter using tire pressure sensors on the trailer for a system that does not utilize an integrated trailer brake controller. The method 100 begins with the tow vehicle in park 102. A trailer may or may not be connected at this stage. When the vehicle begins moving 104 a timer started and a temporary sensor identification counter is initiated. The rolling sensors on the trailer begin transmitting 106 their sensor identifications to the tow vehicle, where they are stored 108 in a database. The method listens 110 for the sensors until the timer expires. In the event the timer expires and no sensors have transmitted, the method indicates 112 no trailer has been connected. In the event the counter is greater than one, the temporary sensor identifications transmitted by the sensors are compared 114 to a known sensor database 116.

In the event the temporary sensor identifications match the identifications stored in the known sensor database, the method can begin tracking 118 the usage profile for the known trailer configuration associated with the known sensor identifications. In the event the temporary sensor identifications do not match the sensor identifications that are known to be associated with a stored trailer configuration, the method provides the option for a user to save a new trailer configuration 120 so that the trailer usage profile can be tracked and referenced in the future when the trailer is used again. In the alternative, a user may choose to ignore 122 the request.

Figure 3:
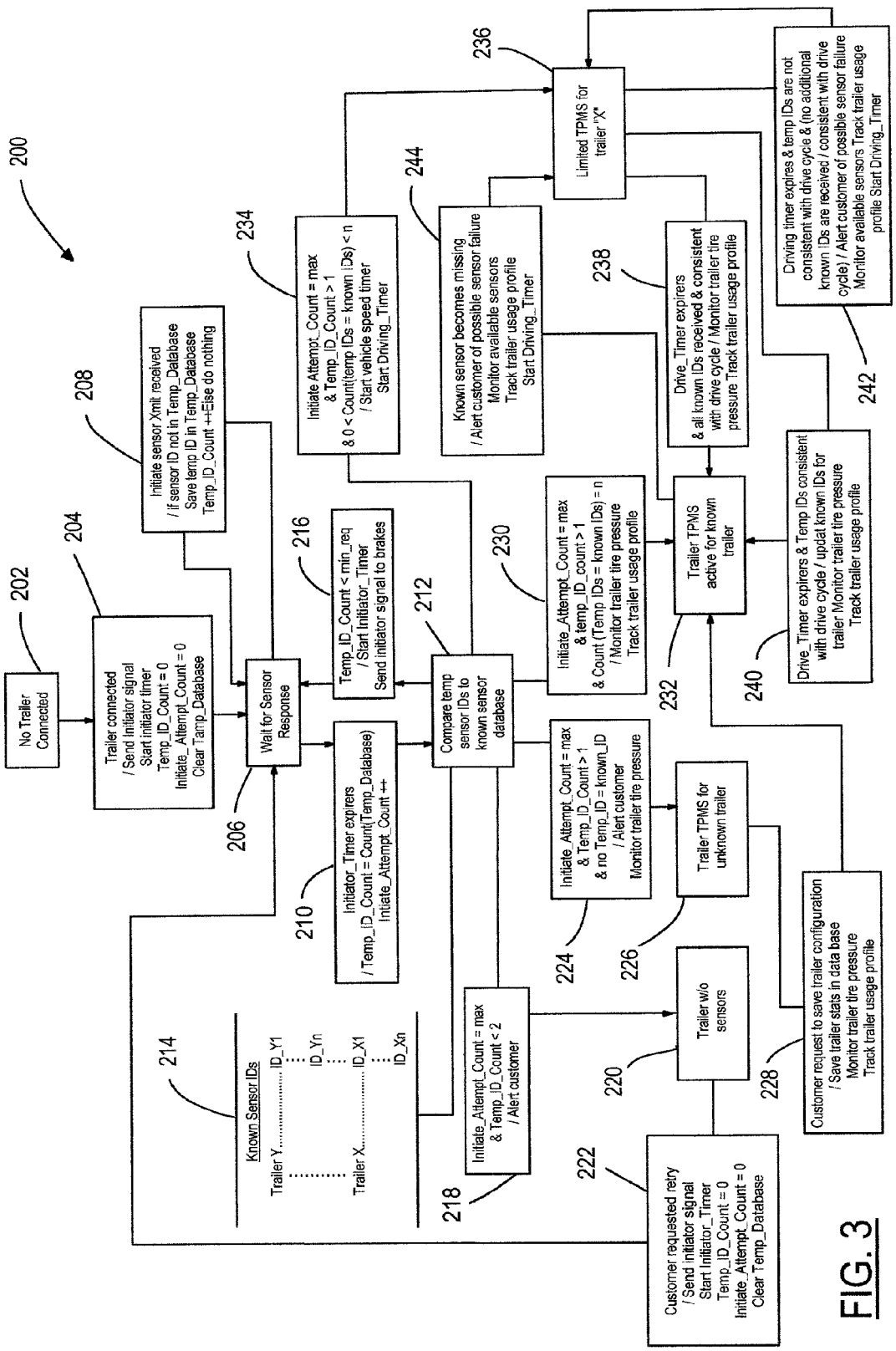
FIG. 3 is an example of a state diagram for the method of the inventive subject matter using an initiator based tire pressure monitoring system.

FIG. 3 is an example of a state diagram for the method of the inventive subject matter when the tow vehicle has a trailer brake controller, integrated or otherwise. The state diagram describes the behavior of the system by describing possible states of an object as events in the system occur according to the method of the inventive subject matter. In the present example, the sequence 200 begins with the state of a trailer's connection 202 to a vehicle. Upon connection of a trailer, an initiation sequence begins 204. The initiation sequence includes an initiator signal being sent from the vehicle's integrated trailer brake controller to the trailer brakes. An Initiator Timer is started and counters including a Temporary_ID counter and an Initiate_Attempt counter are reset. Further, a temporary database that stores the sensor ID's is cleared.

The system waits 206 for any sensor response. Upon excitation by the initiators, which may also be an electromagnetic field generated by the trailer brake electromagnets, the tire pressure sensors on the trailer will transmit 208 an identification signal that is received by the integrated trailer brake controller. Any received sensor ID is stored in the temporary database and the Temporary_ID counter is incremented. After a predetermined time elapses 210, i.e., the Initiator Timer expires, and/or all of the pressure sensors have sent ID's, a comparison 212 of the ID's stored in the temporary database is made to known sensor ID's 214 that are stored for one or more trailers that the vehicle operator has used and stored in the past. In the event less than all the sensor ID's have been received at the trailer brake controller, the Initator_Timer may be reset and another initiator signal is sent 216 to the brakes.

Once the timer expires, there are four possible scenarios that may exist. In one possible scenario 218, less than two pressure sensor ID's have been detected by the trailer brake controller. This result may be the result of a trailer without sensors 220 being connected to the tow vehicle. In this scenario, a manual retry 222 is provided so that an operator can request another initiation process take place. This scenario may indicate a problem with the connection, a trailer without sensors, or other operator error. The manual retry 222 may help the vehicle operator to correct the situation, or at least make the situation known to the operator.

In another possible scenario 224, sensor ID's have been detected, but none of the detected ID's matches stored ID's for known trailer configurations stored previously by the vehicle operator. At least two pressure sensors have been identified, but cannot be matched with stored sensor ID's. In this scenario, an unknown trailer has been connected 226. The vehicle operator is provided the option of storing 228 the trailer in the integrated trailer brake controller for future reference. Tire pressure monitoring on the trailer may proceed. Furthermore, relevant data may be collected and stored for improved performance, such as scheduled maintenance.

In a third scenario 230, all of the sensor ID's stored in the temporary database have been matched with stored, or known, sensor ID's. In this scenario, the trailer connected to the trailer brake controller is a known trailer 232, and the monitoring proceeds. For a known trailer configuration, the appropriate gain setting may be automatically applied to the trailer brake controller.

In a fourth scenario 234, less than all the sensor ID's may be matched to known sensor ID's already stored in the trailer brake controller. This may occur, for example, when a sensor is delayed in transmitting or has been replaced on a trailer and the new sensor ID has not yet been associated with the trailer and the integrated trailer brake controller. This results in limited tire pressure monitoring 236 for the trailer. In this scenario, the tire pressure monitoring will begin and other vehicle states will be monitored in order to determine if in fact the unidentified sensor should be associated with the trailer. A Vehicle_Speed timer and a Start_Driving timer will begin counting for a predetermined period of time 234.

The unidentified sensor identification may be the result of a sensor that was delayed in responding to the initiator signal. In this case 238, if the Start_Driving timer expires and the previously unidentified sensor becomes known and has characteristics that are consistent with those of the known sensors, the trailer tire pressure monitoring will continue to proceed.

It may also be possible that the sensor is a newly installed sensor. In this case, 240 the tire pressure monitoring system stores various thresholds, calibrations, tire characteristics, wheel characteristics, serial numbers, conversion factors, temperature probes, spare tire operating parameters, and other values needed in the calculation, calibration, and operation of the tire pressure monitoring system as outlined in U.S. Pat. No. 7,026,922. These characteristics may be used to identify the newly installed sensor. For the case of a potential newly installed sensor 240, characteristics of the unidentified sensor may be compared to known sensors in order to determine if the sensor should in fact be associated with the known trailer. In particular, temperature characteristics may be monitored. In the event the temperature characteristics of the unidentified sensor are consistent with the drive cycle as well as the temperature characteristics of the known sensors, the previously unidentified sensor ID will be updated in the stored known ID's for this particular trailer. Trailer tire pressure monitoring will proceed.

In the event the unidentified sensor identification remains unidentified 242, and sensor characteristics, such as temperature, are not consistent with the drive cycle, the vehicle operator is alerted to the possibility of a sensor failure. In this case, tire pressure monitoring will proceed with the available sensors. The Start_Driving timer may be reset to continue to monitor for the sensor ID. This will ensure identification of the sensor should the problem lie in transmission delay.

In yet another possible state that would result in limited tire pressure monitoring, a known sensor becomes missing during monitoring 244. In this case, the vehicle operator is notified of a possible sensor failure and the remaining sensors are monitored.

While the present invention has been described herein with reference to an initiator based TPMS and an integrated brake controller. It is possible that the TPMS sensor's transmission of the sensor ID is capable of being used according to the inventive subject matter in a system other than the specific example described herein. Furthermore, a controller other than an integrated trailer brake controller, or even an aftermarket trailer brake controller may be used to select the trailer configurations stored in memory.

When a trailer brake controller is present on the tow vehicle, the trailer need not be in motion in order for the controller to recognize that a trailer has been connected. In the alternative, for a system without a trailer brake controller, the trailer must be in motion in order for the TPMS to be used to detect the trailer. In yet another alternative embodiment, a trailer may be identified by the reverse camera system 15 using image processing or other known identification methods such as recognition of an ID label or sticker on the trailer that is seen by the camera upon connection of the trailer to the tow vehicle, which also does not require the trailer be in motion for detection of the connection. In yet another embodiment, the trailer's electromagnetic brakes may be used as an "initiator" and can trigger the tire pressure sensors to transmit upon connection of the trailer to the vehicle as described and commonly assigned in U.S. patent application Ser. No. 12/265,093 filed on Nov. 5, 2008.

Identifying the trailer and applying a known trailer configuration for trailer brake control is advantageous in various ways. For example, the tow vehicle may be initiated and calibrated during start-up for the particular trailer being towed. The system may also track and store data relevant to the trailer being towed, such as mileage, average speed, maximum speed, etc. The data collected in such a trailer usage profile is useful for scheduling maintenance and for improving general performance characteristics of the trailer and the tow vehicle.

Regardless of how the trailer is identified upon connection, applying the trailer configuration for a particular trailer may also involve assigning a gain to a trailer brake controller. Most trailers being towed by a vehicle have an electric braking system to aid an operator in stopping the trailer when brakes are applied to the tow vehicle. Typically this is accomplished by sending a pulse width modulated signal to the electric trailer brakes. The gain of the pulse width modulated signal will determine how much the trailer brakes will assist in decelerating the trailer. The gain varies from trailer to trailer and is also a function of weight, load, number of brakes, number of axles, and much more. The problem is that a customer typically has to reset this gain each time a trailer is attached. Therefore, if the trailer can be identified, and a stored trailer brake configuration may be applied, the gain may also be automatically set as stored in the trailer brake configuration upon trailer identification.

The trailer brake configuration may store the last gain setting for a particular trailer being towed and apply that gain upon connection and identification of the trailer to the tow vehicle. If at any time the driver changes the gain setting, the new gain setting may be stored in the trailer configuration for application the next time the trailer is attached.

An advantage of the inventive subject matter is that no additional hardware is necessary, which results in no added cost. The system is self calibrating, in that no operator/driver input is required.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the steps recited in any method or process claims may be executed in any order and are not limited to the specific order presented in the claims. The equations may be implemented with a filter to minimize effects of signal noises. Additionally, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

The invention claimed is:

1. A method of identifying a trailer connected to a tow vehicle comprising the steps of:
    connecting the trailer to the tow vehicle having a controller and a tire pressure monitoring system;
    activating tire pressure sensors on the trailer in response to the trailer connection:
    transmitting a signal from the sensors on the trailer, the signal containing a sensor identification;
    receiving the sensor identification at the controller on the tow vehicle:
    comparing the sensor identification in the transmitted signal to known sensor identifications stored in a database:
    identifying a trailer configuration stored in the controller and associated with the known sensor identifications; and
    collecting and storing data relevant to the identified trailer in the trailer configuration.

2. The method as claimed in claim 1 further comprising the step of applying a stored pulse width modulated gain to the controller for trailer brake control of the identified trailer.

3. The method as claimed in claim 1 further comprising the steps of:
    identifying unknown sensor identifications in the transmitted signals as sensor identifications that are not matched with known sensor identifications stored in the database;
    presenting an option to store sensor identifications in the database of known sensor identifications thereby creating a trailer configuration to be stored by the integrated trailer brake controller and associated with the trailer having previously unknown sensor identifications; and
    tracking a usage profile of the newly created trailer configuration.

4. The method as claimed in claim 1 further comprising the steps of:
    detecting when a known sensor stops transmitting; and
    notifying an operator of a potential sensor failure.

5. The method as claimed in claim 1 further comprising the steps of:
    matching less than all of the sensor identifications in the transmitted signals with known sensor identifications in the database;
    waiting for a predetermined time; and
    matching remaining sensor identifications in the transmitted signals with known sensor identifications in the database.

6. The method as claimed in claim 1 further comprising the steps of:
    matching less than all of the sensor identifications in the transmitted signals with known sensor identifications in the database, whereby unmatched sensor identifications are potential new sensors;
    waiting for a predetermined time;
    verifying that any unmatched sensor identifications have parameters consistent with parameters for known sensor identifications thereby deeming potential new sensors as known sensors; and
    updating a trailer configuration with new known sensor identifications.

7. The method as claimed in claim 1 further comprising the steps of:
    matching less than all of the sensor identifications in the transmitted signals with known sensor identifications in the database, whereby unmatched sensor identifications are potential new sensors;
    waiting for a predetermined time;
    verifying that any unmatched sensor identifications have parameters inconsistent with parameters for known sensor identifications thereby deeming potential new sensors as known sensors; and
    notifying an operator of a potential sensor failure.

8. A system for identifying a trailer having electric brakes and being connected to a tow vehicle, the system comprising:
    a controller on the tow vehicle;
    a plurality of pressure sensors attached to each trailer tire for transmitting a respective plurality of identification signals to the controller; and
    a database of sensor identification signals related to a particular trailer, the database being stored in the controller;
    wherein the controller identifies the plurality of pressure sensor identifications, identifies the trailer from the database and selects a trailer configuration associated with the identified trailer, whereby the trailer configuration collects and stores data relevant to the identified trailer.

9. The system as claimed in claim 8 wherein controller is an integrated trailer brake controller.

10. The system as claimed in claim 8 wherein the tow vehicle has a tire pressure monitoring system.

11. The system as claimed in claim 8 wherein the tow vehicle has an initiator based tire pressure monitoring system.

12. The system as claimed in claim 11 wherein the controller further comprises an integrated trailer brake controller.

13. The system as claimed in claim 8 wherein the trailer configuration further comprises a pulse width modulated gain control setting for the identified trailer.

14. A method of identifying a trailer being connected to a tow vehicle, the method comprising the steps of:
    recognizing a connection of the trailer to the tow vehicle;
    selecting a trailer configuration stored in memory that is associated with the connected trailer; and
    collecting and storing data relevant to the connected trailer in the selected trailer configuration.

15. The method as claimed in claim 14 wherein the tow vehicle further comprises a tire pressure monitoring system and the step of recognizing the connection of the trailer to the tow vehicle further comprises:

exciting tire pressure sensors on the trailer in response to the trailer connection;

transmitting a sensor identification signal from the tire pressure sensors on the trailer to a tire pressure monitoring system;

identifying the tire pressure sensors on the trailer in the tire pressure monitoring system by comparing the transmitted sensor identification to a database of known sensor identifications related to a trailer configuration in order to identify the connected trailer.

16. The method as claimed in claim 15 wherein the step of exciting tire pressure sensors on the trailer in response to the trailer connection further comprises exciting the tire pressure sensors using electromagnets associated with brakes on the trailer.

17. The method as claimed in claim 14 wherein the step of recognizing the connection of the trailer to the tow vehicle further comprises identifying the trailer using a reverse camera system on the tow vehicle.

18. The method as claimed in claim 15 further comprising the steps of:

identifying unknown sensor identifications in the transmitted signals; and presenting an option to store sensor identifications in the database of known sensor identifications thereby creating a new trailer configuration to be stored by the controller.

19. The method as claimed in claim 15 further comprising the steps of:

detecting when a known sensor stops transmitting; and generating a signal notifying an operator of a potential sensor failure.

20. The method as claimed in claim 15 further comprising the steps of:

matching less than all of the sensor identifications in the transmitted signals with known sensor identifications in the database:

waiting for a predetermined time; and matching remaining sensor identifications in the transmitted signals with known sensor identifications in the database.

21. The method as claimed in claim 15 further comprising the steps of:

matching less than all of the sensor identifications in the transmitted signals with known sensor identifications in the database, whereby unmatched sensor identifications are potential new sensors;

waiting for a predetermined time;

verifying any unmatched sensor identifications have parameters that are consistent with parameters for known sensor identifications thereby deeming potential new sensors as known sensors; and updating a trailer configuration with new known sensor identifications.

22. The method as claimed in claim 15 further comprising the steps of:

matching less than all of the sensor identifications in the transmitted signals with known sensor identifications in the database, whereby unmatched sensor identifications are potential new sensors;

waiting for a predetermined time;

verifying any unmatched sensor identifications have parameters that are inconsistent with parameters for known sensor identifications thereby deeming potential new sensors as known sensors; and generating a signal for notifying an operator of a potential sensor failure.

23. The method as claimed in claim 14 further comprising the step of applying a stored pulse width modulated gain to the controller for trailer brake control of the identified trailer.

\* \* \* \* \*